United States Patent
Oswald et al.

[11] Patent Number: 6,127,632
[45] Date of Patent: *Oct. 3, 2000

[54] NON-METALLIC ARMOR FOR ELECTRICAL CABLE

[75] Inventors: Howard A. Oswald; Grant T. Harris, both of Lawrence, Kans.

[73] Assignee: Camco International, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,266

[22] Filed: Jun. 24, 1997

[51] Int. Cl.[7] .................................................. H01B 7/00
[52] U.S. Cl. ........................ 174/120 R; 174/113 R; 174/120 C; 174/121 R
[58] Field of Search .................. 174/120 R, 120 C, 174/113 R, 121 R, 124 R, 106 R, 102 R, 110 R

[56] References Cited

U.S. PATENT DOCUMENTS

| | | | |
|---|---|---|---|
| 3,217,084 | 11/1965 | Feick, III | 174/25 |
| 3,322,889 | 5/1967 | Bird et al. | 174/113 R |
| 3,485,939 | 12/1969 | Brown et al. | 174/107 |
| 3,745,233 | 7/1973 | Lania et al. | 174/113 R |
| 3,790,697 | 2/1974 | Buckingham | 174/102 |
| 4,292,463 | 9/1981 | Bow et al. | 174/107 |
| 4,449,013 | 5/1984 | Garschick | 174/103 |
| 4,675,475 | 6/1987 | Bortner et al. | 174/113 R |
| 4,691,082 | 9/1987 | Flatz et al. | 174/106 R |
| 5,086,196 | 2/1992 | Brookbank et al. | 174/106 R |
| 5,171,938 | 12/1992 | Katsumata et al. | 174/36 |
| 5,227,586 | 7/1993 | Beauchamp | 174/122 R |
| 5,280,137 | 1/1994 | Ward | 174/120 R |
| 5,384,430 | 1/1995 | Anthony et al. | 174/115 |
| 5,633,075 | 5/1997 | Park et al. | 442/187 |

*Primary Examiner*—Kristine Kincaid
*Assistant Examiner*—William H. Mayo, III
*Attorney, Agent, or Firm*—Fletcher, Yoder & Van Someren

[57] ABSTRACT

A multiconductor electrical cable, for use in a subterranean wellbore, having which a plurality of electrical conductors, a jacket of insulation material, and a non-metallic armor. The non-metallic armor comprises one or more layers of extruded materials or an external wrapping of materials, selected from the group consisting of extruded thermoplastic materials, extruded thermoset materials, and fiber reinforced composite materials. The non-metallic armor eliminates corrosion problems associated with prior metallic armors, and provides significant weight savings over prior metallic armors.

18 Claims, 4 Drawing Sheets

NON-METALLIC ARMOR FOR ELECTRICAL CABLE

BACKGROUND OF THE INVENTION

1. Field of the Invention

The present invention relates to protective armor used on electrical cables and, more particularly, to armor used on electrical cables for use in subterranean wellbores.

2. Description of Related Art

Multiconductor electrical cables used to power wellbore equipment, such as electrical submergible pumping systems, must be capable of withstanding the high temperatures, high pressures and/or corrosive fluids often encountered within subterranean wellbores. As used herein, the term "high temperature" means temperatures of greater than about 180 F. and as high as about 500 F. The term "high pressure" means pressures as high as about 5,000 psi. Further, the term "corrosive fluids" means liquids and gases which can cause degradation to the cable's insulating materials and/or corrosion to the electrical conductors, such as liquids and/or gases containing hydrogen sulfide, carbon dioxide, brine, water, and the like.

Such electrical cables include an outer protective armor made from helically wrapped and interlocking metal material, such as galvanized steel. These cables should be protected from damage since the submergible pumping systems will occasionally be pulled from the wellbores and reinstalled therein. During this retrieval and reinstallation significant damage can occur to the cable due to deterioration of the integrity of the metallic armor, such as by corrosion. In actuality, the use of metallic armor can accelerate corrosion of metallic bands and/or cable anchors used within the wellbore, as well as the wellbore tubing itself if the cable contacts the tubing. In many corrosive environments, special metal armor materials are used, such as stainless steel and Monel; however, these special metal materials add significantly to the cost of a cable. In addition, there are certain corrosive wellbore environments where these special metal materials will be damaged. There is a need for an armor material that can retain its integrity, to resist damage to the underlying cable, even after long term exposure to high temperatures, high pressures and corrosive fluids, and not cause other downhole components to corrode.

Another problem with existing cable is that the metallic armor adds significantly to the overall weight of the cable. Wellbore cable does not have the internal strength to uphold its own weight past about 50 feet. Therefore, wellbore cables are supported in some manner to the production tubing, such as by banding, clamps or cable anchors. If the weight of the cable could be reduced, then the number of the bands or cable anchors could be reduced by increasing the spacing between such bands or clamps. If the weight of the cable could be reduced, then the transportation costs can be reduced, especially when having to deliver large reels of cable to remote locations. There is a need for a wellbore cable with reduced weight over existing wellbore cables.

SUMMARY OF THE INVENTION

The present invention has been contemplated to overcome the foregoing deficiencies and meet the above described needs. The present invention is a non-metallic armor for use on multiconductor electrical cable, such as the type of cable used within subterranean wellbores. The non-metallic armor comprises one or more layers of extruded materials or an external wrapping of materials, selected from the group consisting of extruded thermoplastic materials, extruded thermoset materials, and fiber reinforced composite materials. The non-metallic armor eliminates problems with prior metallic armors, such as failures due to corrosion, and provides significant weight savings over prior metallic armors.

DETAILED DESCRIPTION OF THE PREFERRED EMBODIMENTS

As described briefly above, the present invention is a non-metallic armor for use on a multiconductor electrical cable for use in subterranean wellbores. The non-metallic armor comprises one or more layers of extruded materials or an interlocking external wrapping of materials, selected from the group consisting of extruded thermoplastic materials, extruded thermoset materials, and fiber reinforced composite materials. The non-metallic armor eliminates problems with prior metallic armors, such as failures due to corrosion, and provides significant weight savings over prior metallic armors.

As used herein the term "armor" means any outer protective covering or shield that protects one or more covered members (e.g., wires or tubes) from damage by abrasion, punctures or crushing forces, and/or that provides restrainment or containment for the covered members. Also, as used herein the term "non-metallic" means any material that does not have a metal as its major constituent. For clarification, some metal may be present within the material, such as a wire mesh may be imbedded within a polymeric material, and still be "non-metallic" for the purposes of this invention. On the other hand, a conventional steel armor with a relatively thin polymeric coating would not be considered as being "non-metallic" for the purposes of this invention.

In the following discussion the electrical cable will be referred to as being for use in subterranean wellbores, and preferably for use in high temperature, high pressure and/or corrosive fluid wellbores. As used herein, the term "high temperature" means temperatures of greater than about 180 F. and as high as about 500 F. The term "high pressure" means pressures as high as about 5,000 psi. Further, the term "corrosive fluids" means liquids and gases which can cause degradation to insulating materials and/or corrosion to the electrical conductors, such as liquids and/or gases containing hydrogen sulfide, carbon dioxide, brine, water, and the like. However, it should be understood that the non-metallic armor of the present invention can be used on other types of electrical cables, such as cables for use in water wells, and non-wellbore applications, such as buried cable, subsea cable, surface-laid cable, suspended cable, and the like. In addition, the non-metallic armor of the present invention can be used not only on multiconductor electrical power cables, but also on single conductor cables and wires, as well as tubes, pipes and conduits for conveying fluids, fiber optics, and the like.

Figure 1:
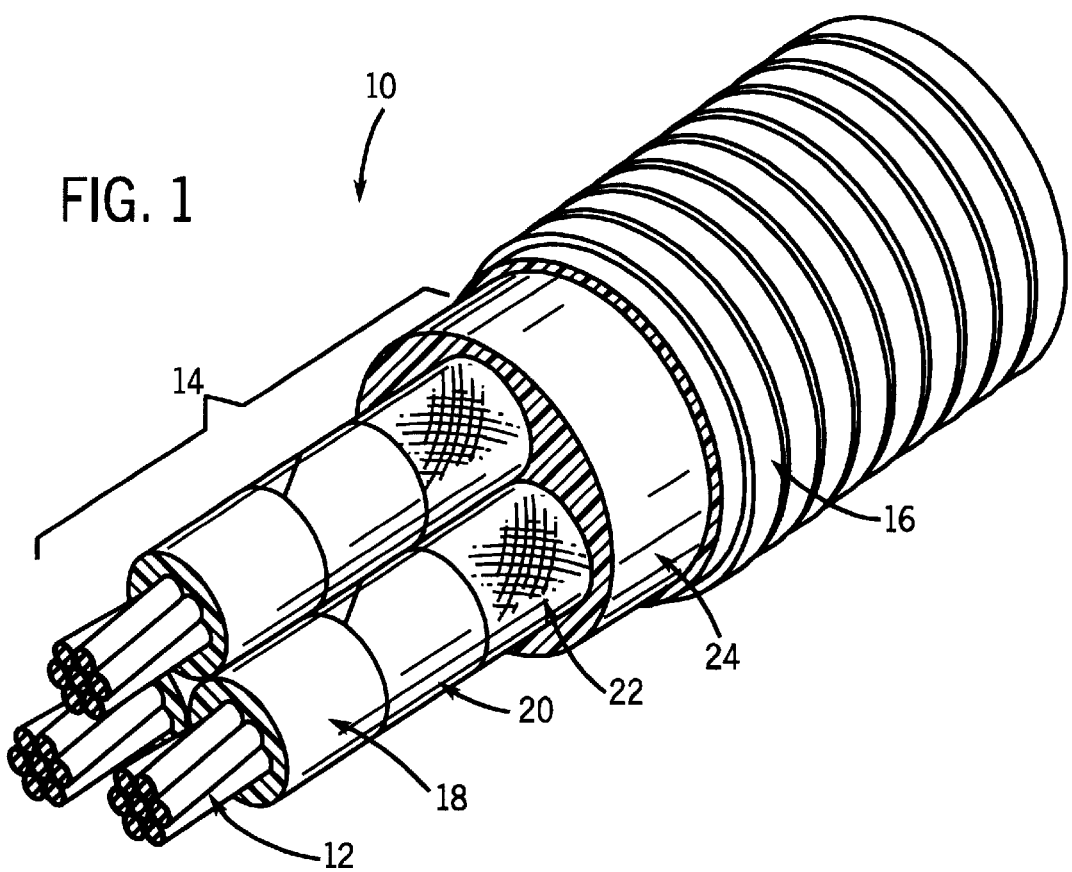
FIGS. 1–2 show cross-sectional, perspective views of alternate preferred embodiments of a non-metallic protective armor of the present invention used on multiconductor electrical cable.

FIG. 1 shows one preferred embodiment of the non-metallic armor of the present invention wrapped onto a multiconductor electrical cable 10. The cable 10 comprises one or more electrical conductors 12, or fluid conveying conduits, fiber optics and the like, surrounded by one or more layers of insulation, barrier and jacket materials, hereinafter collectively referred to as the cable core 14. A non-metallic armor 16 is applied to the outside of the cable core 14, as will be described in more detail below. The non-metallic armor 16 comprises one or more layers of non-metallic material(s) that are wrapped around the cable core 14 or are heat extruded onto the cable core 14. The non-metallic materials are preferably extruded thermoplastic materials, extruded thermoset materials, and fiber reinforced composite materials.

More specifically, for the preferred embodiment shown in FIG. 1, a plurality of copper or copper alloy electrical conductors 12, either single wires or multiple twists of wires (as shown), are surrounded by an elastomeric insulation material 18, such as ethylene propylene diene methylene terpolymer ("EPDM") or polypropylene rubber. A fluid barrier 20 is applied to the insulation material 18, and can comprise one or more extruded layers or preferably a helically wrapped tape of a fluorocarbon polymer. A protective braid 22, such as a polyester or nylon material, is applied over the fluid barrier 20, and a jacket 24 of insulation is then applied thereto. The jacket 24 preferably comprises one or more extruded layers of elastomeric material, such as EPDM or nitrile rubber. Thereafter, the non-metallic armor 16 is applied over the jacket 24.

Figure 2:
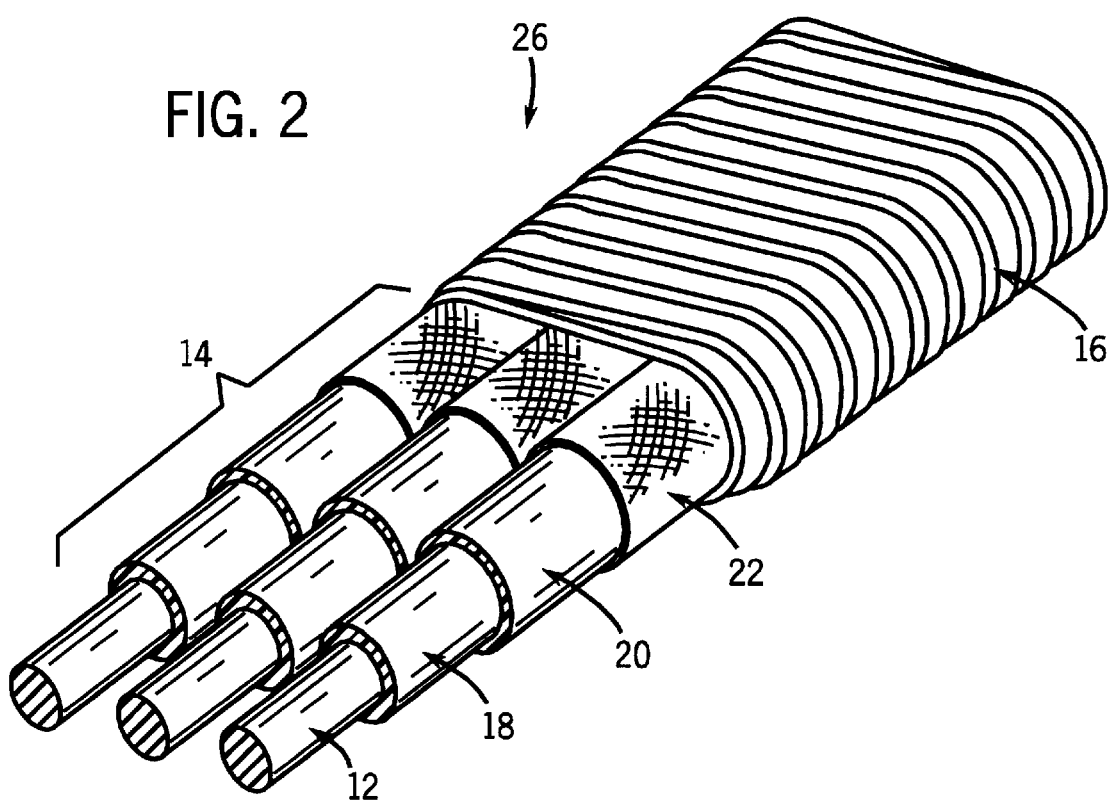

FIG. 2 shows a flat cable 26 similar to the round cable 10 of FIG. 1, but without the jacket of EPDM, and with its conductors arranged in a flat pattern. This type of cable 26 is normally called a motor lead extension or "MLE", and is used in areas of minimum clearances, such as when running a cable past a pump within a wellbore.

Figure 3:
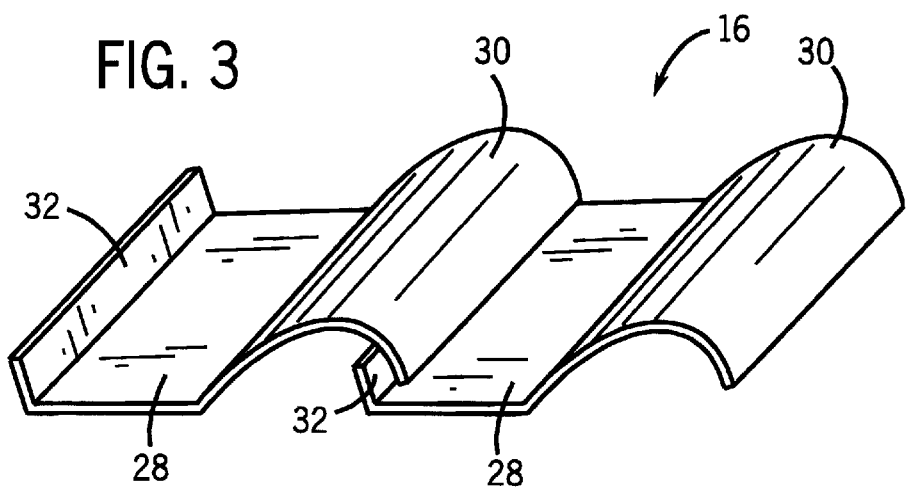
FIG. 3 is a perspective side view of interlocking bands of non-metallic armor of the present invention.
Figure 4:
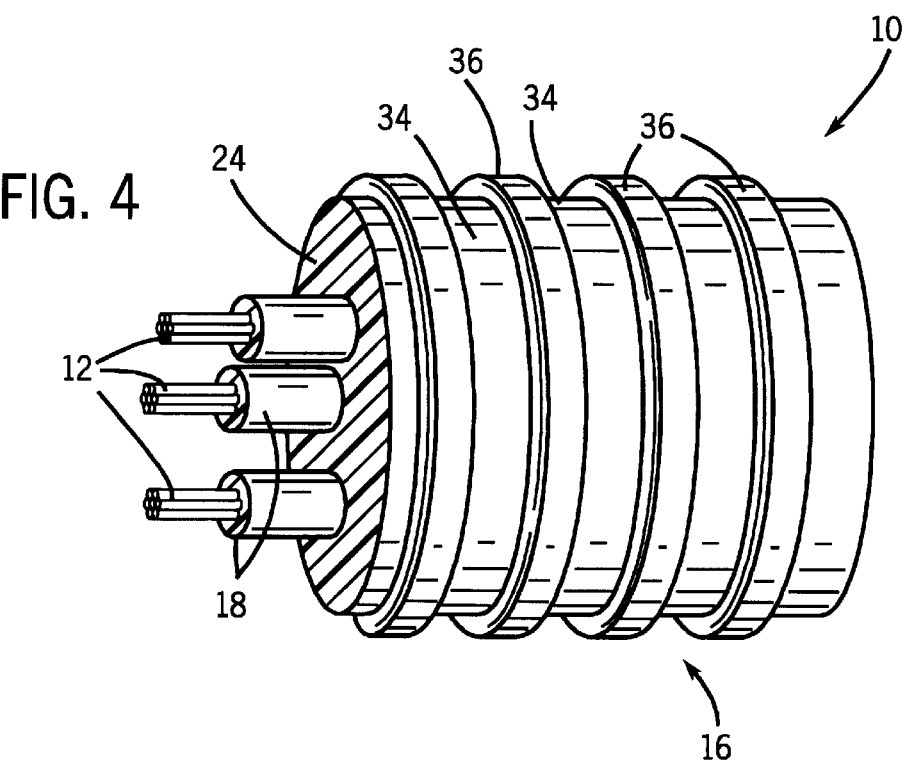
FIG. 4 is a perspective side view of a cable having a corrugated non-metallic armor of the present invention.

The cables 10 and 26, shown in FIGS. 1 and 2, have a non-metallic armor 16 that is formed from a band of the non-metallic material helically wrapped around the cable core 14, in a manner the same as prior armoring processes, as is well known to those skilled in the art. One preferred cross-sectional configuration of the armor 16 comprises a generally flat portion 28 with a cusp 30 that interlocks with a raised edge 32 of the proceeding wrap. Any suitable configuration of the band of non-metallic armor 16 can be used, such as a corrugated configuration made up of a series of lateral grooves with parallel ridges that interlock when wrapped to form longitudinal grooves and ridges on the cable. In addition, an alternate corrugated configuration shown in FIG. 3 comprises a series of longitudinal grooves 34 with parallel ridges 36 that interlock when wrapped to form a radial or helical pattern, as shown in FIG. 4.

Figure 5:
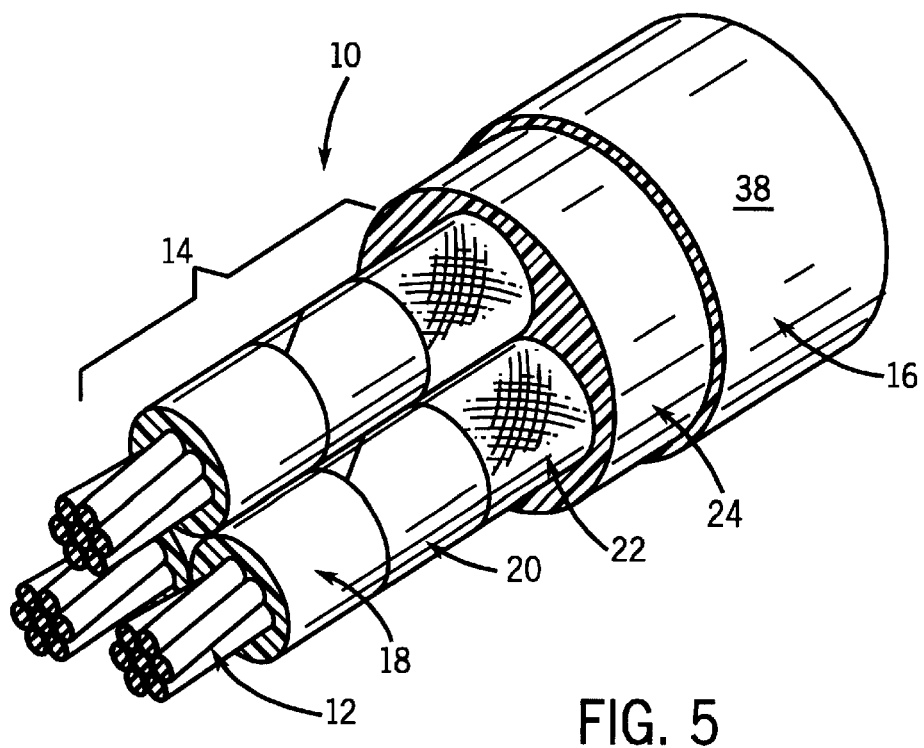
FIG. 5 is a cross-sectional, perspective view of an alternate preferred embodiment of a non-metallic protective armor of the present invention used on multiconductor electrical cable.
Figure 6:
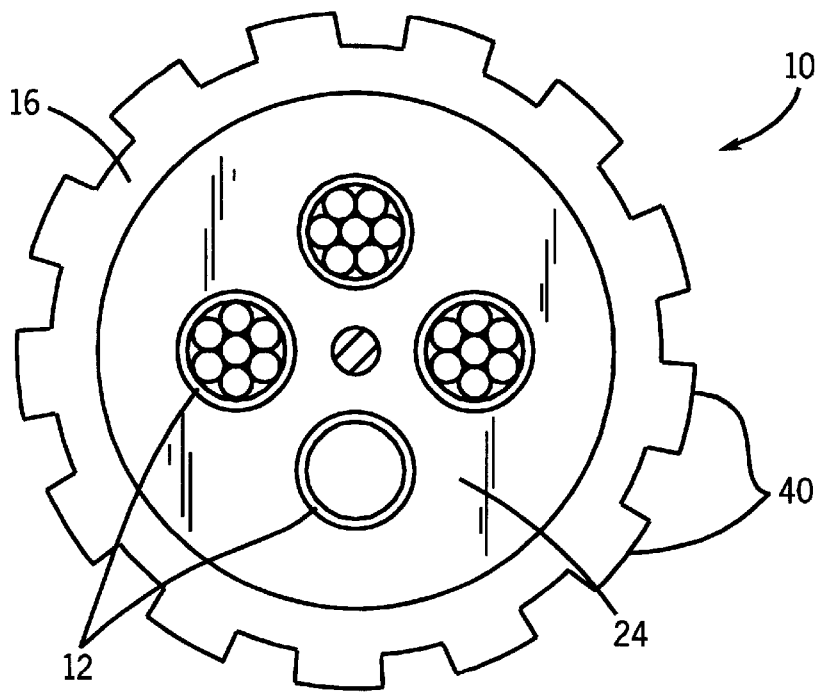
FIG. 6 is an end view of a cable having an extruded non-metallic armor of the present invention.

In the alternative, the non-metallic armor 16 can comprise one or more extruded layers of non-metallic material(s). The extrusion process is basically the same as used to heat extrude the jacket 24, as is well known to those skilled in the art. The extruded armor 16 can have a relatively smooth outer surface 38, as shown in FIG. 5, or it can have ridges 40, as shown in FIG. 6.

As mentioned above, the non-metallic armor 16 can be made from one or more layers of one or more thermoplastic and/or thermoset materials. Preferred thermoplastic materials are acrylonitrile-butadiene-styrene (ABS) copolymers, acetals, tetrafluroethylene-propylene copolymers, hexafluropropylene-vinylidene copolymers, polyamides, arimids, polyaryl sulfones, polyaryl ethers, polyesters, polyether sulfones, polyimides, polyamide-imides, polyphenylene sulfide, polysulfones, polyetherketones, polyetherketones, polyetherketones, polyaryletherketones, polyethylenes, polypropylenes, and copolymers, mixtures, blends and alloys thereof. Preferred thermoset materials are copolymers of acrylonitrile and butadiene, saturated copolymers of acrylonitrile and butadiene, fluroelastomers, polychloroprenes, and copolymers, mixtures, blends and alloys thereof.

Figure 7:
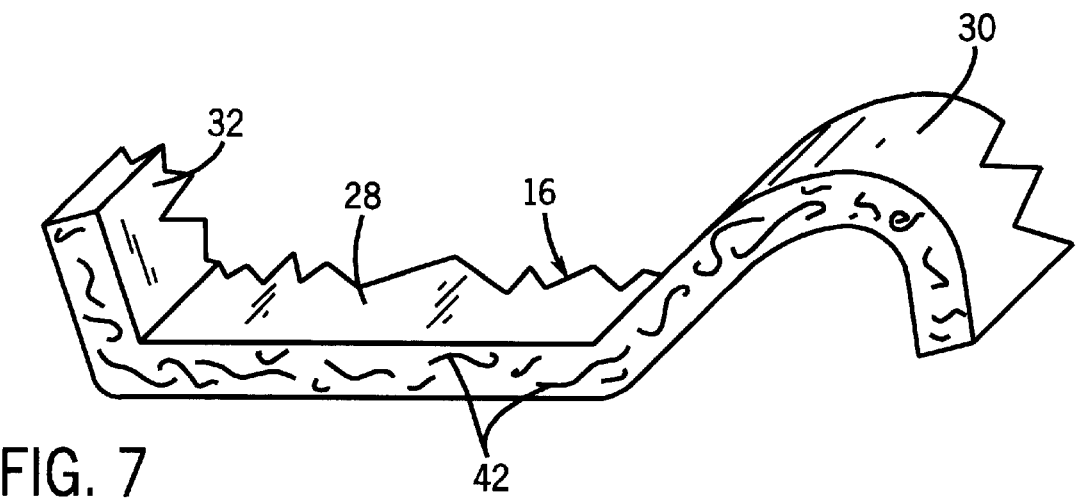
FIG. 7 is a partial perspective side view of a non-metallic armor of the present invention having reinforcing fibers therein.
Figure 8:
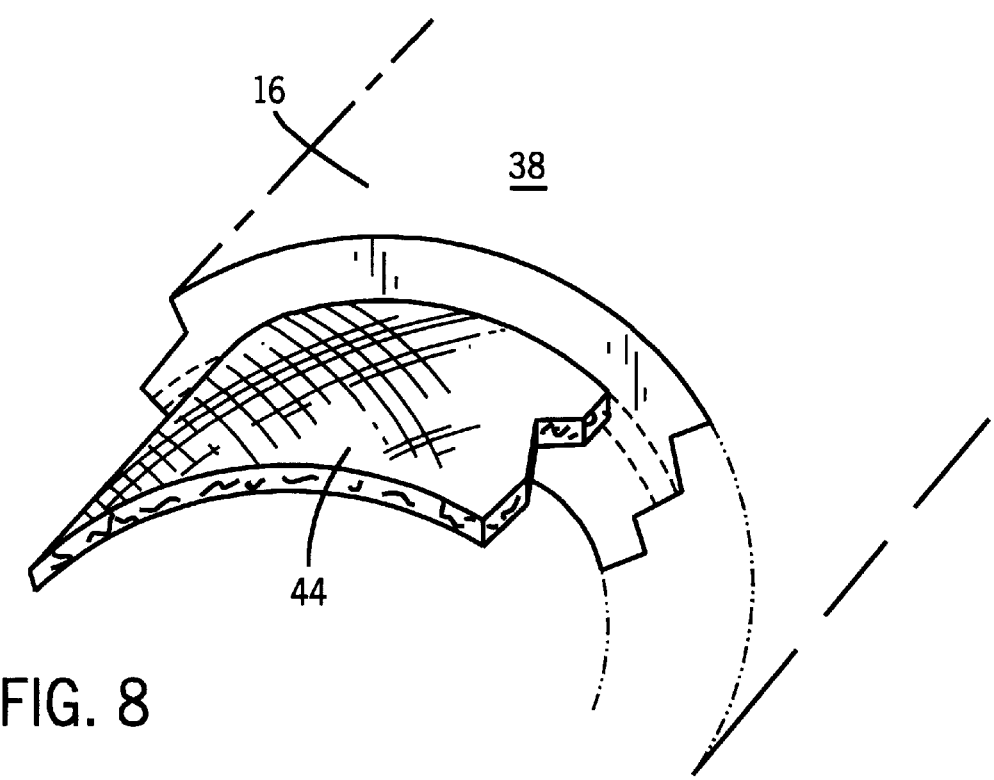
FIG. 8 is a partial perspective side view of a cable having non-metallic armor of the present invention, with a weave of reinforcing material imbedded therein.

In addition, the non-metallic armor 16 can comprise one or more layers of one or more composite materials. Preferred composite materials have as a major constituent one or more of the thermoset or thermoplastic materials mentioned above, but with one or more strengthing or reinforcing materials added thereto. More specifically, the composite materials for use within the non-metallic armor 16 preferably comprise the thermoplastic polymer materials, thermoset polymer materials, and blends thereof, with from about 20% to about 50% by weight of reinforcing fibers selected from the group consisting of carbon-based materials, ceramics, fiberglass, and combinations thereof. FIG. 7 shows one preferred embodiment with a plurality of reinforcing fibers 42 formulated within a band of armor 16 that will be wrapped around a cable core 14. FIG. 8 shows an alternate preferred embodiment with one or more layers, bands or weaves 44 of reinforcing material embedded within an extruded layer of armor 16.

As can be understood from the previous discussion, the non-metallic armor of the present invention eliminates the problems with prior metallic armors, such as failures due to corrosion, and provides significant weight savings over prior metallic armors. For example, the non-metallic armor has a weight of about 0.1–0.2 lbs. per foot of cable length, as compared to about 0.3–0.6 lbs. per foot of cable length for prior metallic armor.

Whereas the present invention has been described in particular relation to the drawings attached hereto, it should be understood that other and further modifications, apart from those shown or suggested herein, may be made within the scope and spirit of the present invention.

What is claimed is:

1. A non-metallic outer protective armor in combination with a multiconductor electrical cable for use in subterranean wellbores, comprising:

a plurality of electrical conductors, each electrical conductor being surrounded by an elastomeric insulation material, a fluid barrier layer and a protective braid layer; and an extruded layer of non-metallic material disposed as a radially outermost layer that extends around the plurality of electrical conductors as a protective armor, wherein the extruded layer is able to withstand temperatures exceeding 180° F.

2. A non-metallic armor in combination with a multiconductor electrical cable for use in subterranean wellbores of claim 1 wherein the non-metallic material comprises one or more thermoplastic materials selected from the group consisting of acrylonitrile-butadiene-styrene (ABS) copolymers, acetals, tetrafluoroethylene-propylene copolymers, hexafluoroprolylene-vinylidene copolymers, polyamides, arimids, polyaryl sulfones, polyaryl ethers, polyesters, polyether sulfones, polyimides, polyamide-imides, polyphenylene sulfide, polysulfones, polyetherketones, polyetheretherketones, polyetherketonesetheretherketones, polyaryletherketones, and copolymers, mixtures, blends and alloys thereof.

3. A non-metallic armor in combination with a multiconductor electrical cable for use in subterranean wellbores of claim 1 wherein the non-metallic material comprises one or more thermoset materials selected from the group consisting of copolymers of acrylonitrile and butadiene, saturated copolymers of acrylonitrile and butadiene, fluroelastomers, polychloroprenes, and copolymers, mixtures, blends and alloys thereof.

4. A non-metallic armor in combination with a multiconductor electrical cable for use in subterranean wellbores of claim 1 wherein the non-metallic material comprises a composite material having thermoplastic polymer materials, thermoset polymer materials, and blends thereof, with from about 20% to about 50% by weight of reinforcing fibers selected from the group consisting of carbon-based materials, ceramics, fiberglass, and combinations thereof.

5. A non-metallic armor in combination with a multiconductor electrical cable for use in subterranean wellbores of claim 4 wherein the composite material includes reinforcing fibers mixed with a polymer material.

6. A non-metallic armor in combination with a multiconductor electrical cable for use in subterranean wellbores of claim 4 wherein the composite material includes reinforcing fibers formed as a weave embedded within a polymer material.

7. A multiconductor electrical cable for use in a subterranean wellbore, comprising:

a plurality of electrical conductors;

an insulation material surrounding each electrical conductor of the plurality of electrical conductors; and a non-metallic armor helically wrapped about the plurality of electrical conductors along their length to protect the plurality of electrical conductors, the non-metallic armor being disposed as an outer layer for exposure to a subterranean wellbore environment, the non-metallic armor being strengthened along its length by reinforcing fibers.

8. A multiconductor electrical cable of claim 7 wherein the insulation material is selected from the group consisting of nitrile rubber, ethylene propylene, ethylene propylene diene methylene terpolymer, polychloroprene, polyolefin elastomer, polyethylene, polypropylene, polyethylene, polyether, and copolymers, mixtures, blends and alloys thereof.

9. A multiconductor electrical cable of claim 7 wherein the non-metallic armor further comprises one or more extruded layers of non-metallic materials selected from the group consisting of thermoplastic materials, thermoset materials, and composite materials.

10. A multiconductor electrical cable of claim 7 wherein the non-metallic armor further comprises an external wrapping of non-metallic materials selected from the group consisting of thermoplastic materials, thermoset materials, and composite materials.

11. A multiconductor electrical cable of claim 7 wherein the non-metallic armor comprises one or more thermoplastic materials selected from a group consisting of acrylonitrile-butadiene-styrene (ABS) copolymers, acetals, tetrafluoroethylene-propylene copolymers, hexafluoroprolylene-vinylidene copolymers, polyamides, arimids, polyaryl sulfones, polyaryl ethers, polyesters, polyether sulfones, polyimides, polyamide-imides, polyphenylene sulfide, polysulfones, polyetherketones, polyetheretherketones, polyetherketonesetheretherketones, polyaryletherketones, and copolymers, mixtures, blends and alloys thereof.

12. A multiconductor electrical cable of claim 7 wherein the non-metallic armor comprises one or more thermoplastic materials selected from a group consisting of copolymers of acrylonitrile and butadiene, saturated copolymers of acrylonitrile and butadiene, fluroelastomers, polychloroprenes, and copolymers, mixtures, blends and alloys thereof.

13. A multiconductor electrical cable of claim 7 wherein the non-metallic armor comprises a composite having thermoplastic polymers materials, thermoset polymer materials, and blends thereof, with from about 20% to about 50% by weight of reinforcing fibers selected from the group consisting of carbon-based materials, ceramics, fiberglass, and combinations thereof.

14. A multiconductor electrical cable of claim 16 wherein the composite material includes reinforcing fibers mixed with a polymer material.

15. A multiconductor electrical cable of claim 16 wherein the composite material includes reinforcing fibers formed as a weave embedded within a polymer material.

16. A non-metallic outer protective armor in combination with an electrical cable for use in subterranean wellbores, comprising a wrap of a non-metallic material surrounding a plurality of conductors wherein the non-metallic material includes a composite material having thermoplastic polymer materials, thermoset polymer materials, and blends thereof, with from about 20% to about 50% by weight of reinforcing fibers selected from the group consisting of carbon-based materials, ceramics, fiberglass, and combinations thereof.

17. A non-metallic armor in combination with a multiconductor electrical cable for use in subterranean wellbores of claim 16 wherein the composite material includes reinforcing fibers mixed with a polymer material.

18. A non-metallic armor in combination with a multiconductor electrical cable for use in subterranean wellbores of claim 16 wherein the composite material includes reinforcing fibers formed as a weave embedded within a polymer material.

* * * * *